(12) United States Patent
Das et al.

(10) Patent No.: US 10,996,878 B2
(45) Date of Patent: May 4, 2021

(54) DATA PIPELINE ARCHITECTURE FOR CLOUD PROCESSING OF STRUCTURED AND UNSTRUCTURED DATA

(71) Applicant: Accenture Global Solutions Limited, Dublin (IE)

(72) Inventors: Jagaran Das, West Bengal (IN); Teresa Sheausan Tung, Tustin, CA (US); Srinivas Yelisetty, Fremont, CA (US); Daniel Corin, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 89 days.

(21) Appl. No.: 16/259,338

(22) Filed: Jan. 28, 2019

(65) Prior Publication Data

US 2019/0155533 A1  May 23, 2019

Related U.S. Application Data

(63) Continuation of application No. 15/378,244, filed on Dec. 14, 2016, now Pat. No. 10,235,076.

(30) Foreign Application Priority Data

Dec. 16, 2015 (IN) .......................... 6730/CHE/2015

(51) Int. Cl.
*G06F 12/00* (2006.01)
*G06F 13/00* (2006.01)
(Continued)

(52) U.S. Cl.
CPC .......... *G06F 3/0635* (2013.01); *G06F 3/0604* (2013.01); *G06F 3/0638* (2013.01);
(Continued)

(58) Field of Classification Search
CPC .... G06F 3/0635; G06F 3/0604; G06F 3/0638; G06F 3/0613; G06F 3/0683;
(Continued)

(56) References Cited

U.S. PATENT DOCUMENTS 7,020,081 B1 * 3/2006 Tani .................... H04L 12/2801
348/E7.07
7,529,794 B2 * 5/2009 Dorai ..................... H04L 51/14
709/204

(Continued)

OTHER PUBLICATIONS

Office Action dated Feb. 18, 2020, from corresponding Indian application No. 6730/CHE/2015, 7 pgs.
(Continued)

*Primary Examiner* — Sheng Jen Tsai
(74) *Attorney, Agent, or Firm* — Brinks Gilson & Lione

(57) ABSTRACT

Scalable architectures provide resiliency and redundancy and are suitable for cloud deployment. The architectures support extreme data throughput requirements. In one implementation, the architectures provide a serving layer and an extremely high speed processing lane. With these and other features, the architectures support complex analytics, visualization, rule engines, and centralized pipeline configuration.

20 Claims, 12 Drawing Sheets

(51) Int. Cl.
G06F 3/06 (2006.01)
G06F 16/2455 (2019.01)
G06F 9/50 (2006.01)
G06F 13/38 (2006.01)
G06F 13/40 (2006.01)

(52) U.S. Cl.
CPC .......... *G06F 9/5072* (2013.01); *G06F 13/382* (2013.01); *G06F 13/4068* (2013.01); *G06F 16/24568* (2019.01); *G06F 3/0613* (2013.01); *G06F 3/0683* (2013.01); *G06F 3/0685* (2013.01)

(58) Field of Classification Search
CPC .... G06F 3/0685; G06F 9/5072; G06F 13/382; G06F 13/4068; G06F 16/24568
USPC ........................................................ 711/117
See application file for complete search history.

(56) References Cited

U.S. PATENT DOCUMENTS

| | | | | |
|---|---|---|---|---|
| 10,235,076 | B2* | 3/2019 | Das | G06F 3/0604 |
| 2002/0047866 | A1* | 4/2002 | Matsumoto | G06F 3/0482 |
| | | | | 715/810 |
| 2002/0057900 | A1* | 5/2002 | Nakajima | H04N 21/4335 |
| | | | | 386/252 |
| 2006/0224668 | A1* | 10/2006 | Ginis | H04L 67/1002 |
| | | | | 709/204 |
| 2007/0014396 | A1* | 1/2007 | Miyauchi | H04L 9/0894 |
| | | | | 380/28 |
| 2012/0066470 | A1* | 3/2012 | Fukuda | G06F 15/17375 |
| | | | | 711/171 |
| 2014/0040433 | A1 | 2/2014 | Russell, Jr. et al. | |
| 2014/0155173 | A1* | 6/2014 | Petersen | G07F 17/3225 |
| | | | | 463/42 |
| 2014/0172929 | A1* | 6/2014 | Sedayao | G06F 16/184 |
| | | | | 707/827 |
| 2014/0257871 | A1* | 9/2014 | Christensen | G06Q 30/0207 |
| | | | | 705/4 |
| 2015/0134796 | A1* | 5/2015 | Theimer | G06F 16/258 |
| | | | | 709/223 |
| 2015/0287352 | A1* | 10/2015 | Watanabe | G09G 3/20 |
| | | | | 345/89 |
| 2016/0034809 | A1* | 2/2016 | Trenholm | G06F 8/35 |
| | | | | 706/20 |
| 2016/0078798 | A1* | 3/2016 | Watanabe | G09G 3/3648 |
| | | | | 345/690 |
| 2016/0086557 | A1* | 3/2016 | Watanabe | G09G 3/3618 |
| | | | | 345/691 |
| 2016/0210908 | A1* | 7/2016 | Seki | G09G 3/3618 |
| 2016/0248676 | A1* | 8/2016 | Thanasekaran | G06F 3/0659 |
| 2017/0006135 | A1* | 1/2017 | Siebel | G06N 5/003 |
| 2017/0063351 | A1* | 3/2017 | Kurokawa | G06N 3/0445 |
| 2017/0177263 | A1* | 6/2017 | Das | G06F 3/0635 |
| 2017/0316749 | A1* | 11/2017 | Kuwajima | G09G 3/3611 |
| 2018/0329644 | A1* | 11/2018 | Das | G06F 3/0644 |

OTHER PUBLICATIONS

Australian Patent Office, First Examination Report to Australian Application No. 2016273909, dated May 31, 2017, (5p).
Australian Patent Office, Second Examination Report for Australian Patent Application No. 2016273909, dated Nov. 6, 2017, pp. 1-3.
Fisher et al. "Spring XD Guide", (Aug. 23, 2015), obtained from the internet on Feb. 12, 2018 from URL: http://repo.spring.io/libs-release/org/springframework/xd/spring-xd/1.2.1.RELEASE/spring-xd-1.2.1.RELEASE-docs.zip, (Mar. 15, 2017), XP055355083 [I] 1-15.
Office Action in India Application No. 201644042808, dated May 6, 2020, 8 pages.
Office Action in Europe Application No. 16204383.0, dated May 15, 2020, 9 pages.
Tutorialspoint.com, "Redis Publish Subscribe", dated Sep. 11, 2014, XP055355367, Retrieved from the Internet on Mar. 15, 2017 from URL: <http://web.archive.org/web/redis/redis_pub_sub.htm>, 4 pages.
Terracotta, "In-Genius: The First Scalable In-Memory Platform for Immediate Insights and Profitable Action from Big Data", dated Nov. 1, 2013, XP055355364, Retrieved from the Internet on Mar. 15, 2017 from URL: <http://odbms.org/wp-content/uploads/2013/11/Terracotta-inGenius.pdf>, 10 pages.
Sean Roberts, "S2DS London 2015—Hadoop Real World", dated Aug. 17, 2015, XP055355366, Retrieved from the Internet on Mar. 15, 2017, from URL: <https://www.slideshare.net/seanorama/s2ds-london-2015-hadoop-real-world>, 71 pages.
Kayvon Fatahalian et al., "Sequoia: Programming the Memory Hierarchy", Supercomputing, 2006. SC '06. Proceedings of the ACM/IEEE SC 2006 Conference, dated Nov. 1, 2006, pp. 4-4, XP055355362, Pi DOI:10.1109/SC.2006.55, 13 pages.
Mark Fisher et al., "Spring Integration Reference Manual", dated Apr. 4, 2015, XP055693508, Retrieved from the Internet on May 11, 2020 from URL: <https://web.archive.org/web/20150404064115if_/http://docs.spring.io:80/spring-integration/reference/pdf/spring-integration-reference.pdf>, 461 pages.
Anonymous, "Spring Integration and Apache Camel | Javalobby", dated Jan. 14, 2010, XP055693869, Retrieved from the Internet on May 11, 2020 from URL: <https://web.archive.org/web/20100114050415/http://java.dzone.com/articles/spring-integration-and-apache>, 6 pages.
Extended European Search Report in Europe Application No. 16204383.0, dated Mar. 24, 2017, 12 pages.

* cited by examiner

```
900

Application Release Date
        released   : 2015-11-17

Name of the Application
        name: ABC Data Processing Application
                       ┌─902
Processing Type ─┘
        processing: Spark-Data-Ingestion
                          ┌─904
Deployment Model ─┘
        deployment: AWS
                  ┌─906
Persistence ─┘
        technique:       ultra-lambda
                              ┌─908
Sources to Connect ─┘
connector:
        source   : Kinesis
                                mode:
                                username:
                                password:
                                url:
                              ┌─910
912─┐ ## Different Modules ─┘
        parsers:
                type: json
                rawdata: com.accenture.analytics.realtime.DmaDTO
                        modules:
                                function: date-parser
                                field: ## on which incoming data field we will apply date parsing
                                function: custom
                        ┌─914   field: ## on which incoming data field we will apply custom parsing
        transformer: ─┘
                type: procedure
                        modules:
                                function: date-transformer
                                field: ## on which incoming data field we will apply date transformation
                                function: epoch-generator
                                field: ## on which incoming data field we will apply epoch transformation
```

```
Analytical Modules  ⟵1002
analytics:
        mode: offline          ⟵1004
        pmml: Regression.pmml
        function: func()
        field: ## on which incoming field we should apply offline analytics
Processing Rules ⟵1006
        rule:
        mode: online           ⟵1008
        rule: ABCRule.drl
Loader  Modules  ⟵1010
        loader:
        sink: Cassandra
        rawdatastorage: com.accenture.analytics.realtime.DmaDTOWrite

Dashboard Type  ⟵1012
Chart Type
Layout
        dashboard:
        type: Basic
        charttype:
        layout:
User authentication ⟵1014
users:
   tom: passwd
   bob: passwd
```

Figure 10

DATA PIPELINE ARCHITECTURE FOR CLOUD PROCESSING OF STRUCTURED AND UNSTRUCTURED DATA

PRIORITY CLAIM

This application is a continuation of U.S. patent application Ser. No. 15/378,244, filed Dec. 14, 2016, which claims priority to India non-provisional application serial number 6730/CHE/2015, filed Dec. 16, 2015, which is titled "Data Pipeline Architecture for Cloud Processing of Structured and Unstructured Data," and which are entirely incorporated by reference.

TECHNICAL FIELD

This application relates to scalable architectures with resiliency and redundancy that are suitable for cloud deployment in support of extreme data throughput requirements.

BACKGROUND

The processing power, memory capacity, network connectivity and bandwidth, available disk space, and other resources available to processing systems have increased exponentially in the last two decades. Computing resources have evolved to the point where a single physical server may host many instances of virtual machines and virtualized functions. These advances had led to the extensive provisioning of a wide spectrum of functionality for many types of entities into specific pockets of concentrated processing resources that may be located virtually anywhere, that is, relocated into a cloud of processing resources handling many different clients, hosted by many different service providers, in many different geographic locations. Improvements in cloud system architectures, including data processing pipelines, will drive the further development and implementation of functionality into the cloud.

BRIEF DESCRIPTION OF THE DRAWINGS

FIG. 9 shows a section of a YAML configuration file for the data pipeline architecture.
FIG. 10 shows a section of a YAML configuration file for the data pipeline architecture.

DETAILED DESCRIPTION

The technologies described below concern scalable data processing architectures that are flexible, resilient and redundant. The architectures are particularly suitable for cloud deployment, where support is needed to handle very high levels of data throughput across multiple independent data streams, with accompanying processing and analytics on the data streams. In one implementation, the architectures provide a visualization stage and an extremely high speed processing stages. With these and other features, the architectures support complex analytics, visualization, rule engines, along with centralized pipeline configuration.

Figure 1:
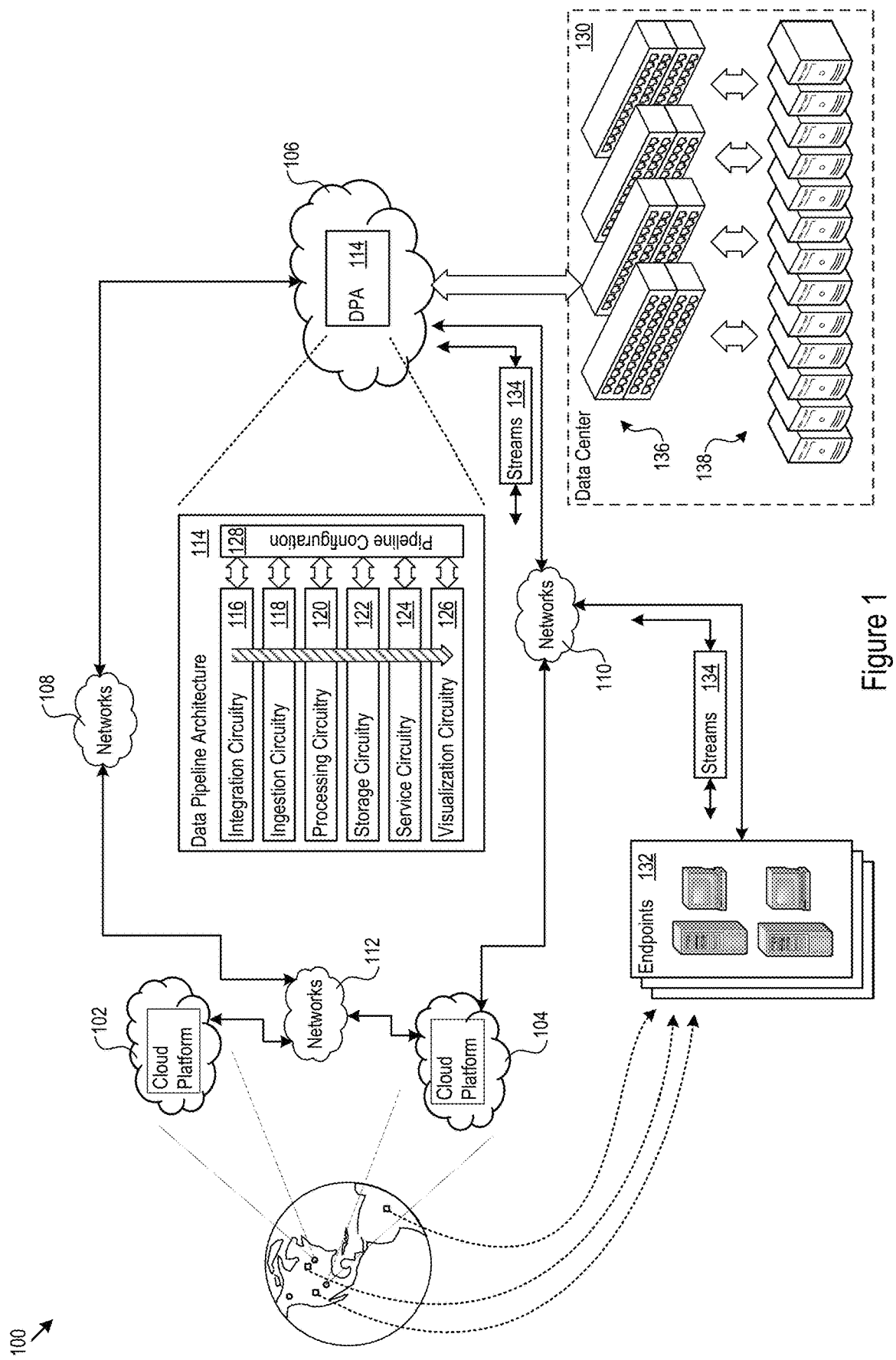
FIG. 1 shows a global network architecture.

FIG. 1 provides an example context for the discussion of technical solutions in the complex architectures described in detail below. The architectures are not limited in their application to the cloud environment shown in FIG. 1. Instead, the architectures are applicable to many other high throughput computing environments.

FIG. 1 shows a global network architecture 100. Distributed through the global network architecture 100 are cloud computing service providers, e.g., the service providers 102, 104, and 106. The service providers may be located in any geographic region, e.g., in any particular area of the United States, Europe, South America, or Asia. The geographic regions associated with the service providers may be defined according to any desired distinctions to be made with respect to location, e.g., a U.S. West region vs. a U.S. East region. A service provider may provide cloud computing infrastructure in multiple geographic locations.

Throughout the global network architecture 100 are networks, e.g., the networks 108, 110, and 112 that provide connectivity within service provider infrastructure, and between the service providers and other entities. The networks may include private and public networks defined over any pre-determined and possibly dynamic internet protocol (IP) address ranges. A data pipeline architecture (DPA) 114 provides a resilient scalable architecture that handles very high levels of data throughput across multiple independent data streams, with accompanying processing, analytics, and visualization functions performed on those data streams. Specific aspects of the DPA 114 are described in more detail below.

The DPA 114 may include integration circuitry 116 configured to connect to and receive data streams from multiple independent data sources, ingestion circuitry 118 configured to parse and validate data received by the integration circuitry 116, and processing circuitry 120 configured to create, store, and update data in a data repository defined, e.g., within the storage circuitry 122. The processing circuitry 120 is also configured to execute analytics, queries, data aggregation, and other processing tasks across scalable datasets.

The service circuitry 124 provides an integration layer between the data repository handled by the storage circuitry 122 and the visualization circuitry 126. The service circuitry 124 connects the storage circuitry 122 to the visualization circuitry 126. The visualization circuitry 126 may include any number of data rendering processes that execute to generate dynamic dashboards, complex data-driven graphical models and displays, interactive and collaborative graphics, and other data visualizations. Each of the data rendering processes communicate with the data repository through the service circuitry 124 to consume data in any source format, process the data, and output processed data in any destination format. In one implementation, the integration circuitry 116 and the service circuitry 124 execute an Apache™ Camel™ integration framework.

Pipeline configuration circuitry 128 within the DPA 114 acts as the backbone of the DPA circuitry. For instance, the pipeline configuration circuitry 128 may configure the circuitry 116-126 to perform on a data-source specific basis, e.g., analytics, data parsing and transformation algorithms, dynamic data model generation and schema instantiation, dynamic representational state transfer (REST) layer creation, specific predictive model markup language (PMML) integration points, and dynamic dashboard creation. A data serialization format like YAML may be used to implement the pipeline configuration circuitry 128. In some implementations, the pipeline configuration circuitry 128 provides a single configuration controlled processing and analytical component with a dynamic integration layer and dashboards.

As just a few examples, the DPA 114 may be hosted locally, distributed across multiple locations, or hosted in the cloud. For instance, FIG. 1 shows the DPA 114 hosted in data center infrastructure 130 for the service provider 106. The data center infrastructure 130 may, for example, include a high density array of network devices, including routers and switches 136, and host servers 138. One or more of the host servers 138 may execute all or any part of the DPA 114.

Endpoints 132 at any location communicate through the networks 108-112 with the DPA 114. The endpoints 132 may unidirectionally or bi-directionally communicate data streams 134 with the DPA 114, request processing of data by the DPA 114, and receive data streams that include processed data, including data visualizations, from the DPA 114. As just a few examples, the endpoints 132 may send and receive data streams from diverse systems such as individual sensors (e.g., temperature, location, and vibration sensors), flat files, unstructured databases and structured databases, log streams, portable and fixed computer systems (e.g., tablet computers, desktop computers, and smartphones), social media systems (e.g., instant messaging systems, social media platforms, and professional networking systems), file servers (e.g., image servers, movie servers, and general purpose file servers), and news servers (e.g., television streams, radio streams, RSS feed servers, Usenet servers, and NNTP servers). The DPA 114 supports very high levels of data throughput across the multiple independent data streams 134 in real-time and near real-time, with accompanying processing and analytics on the data streams 134.

Figure 2:
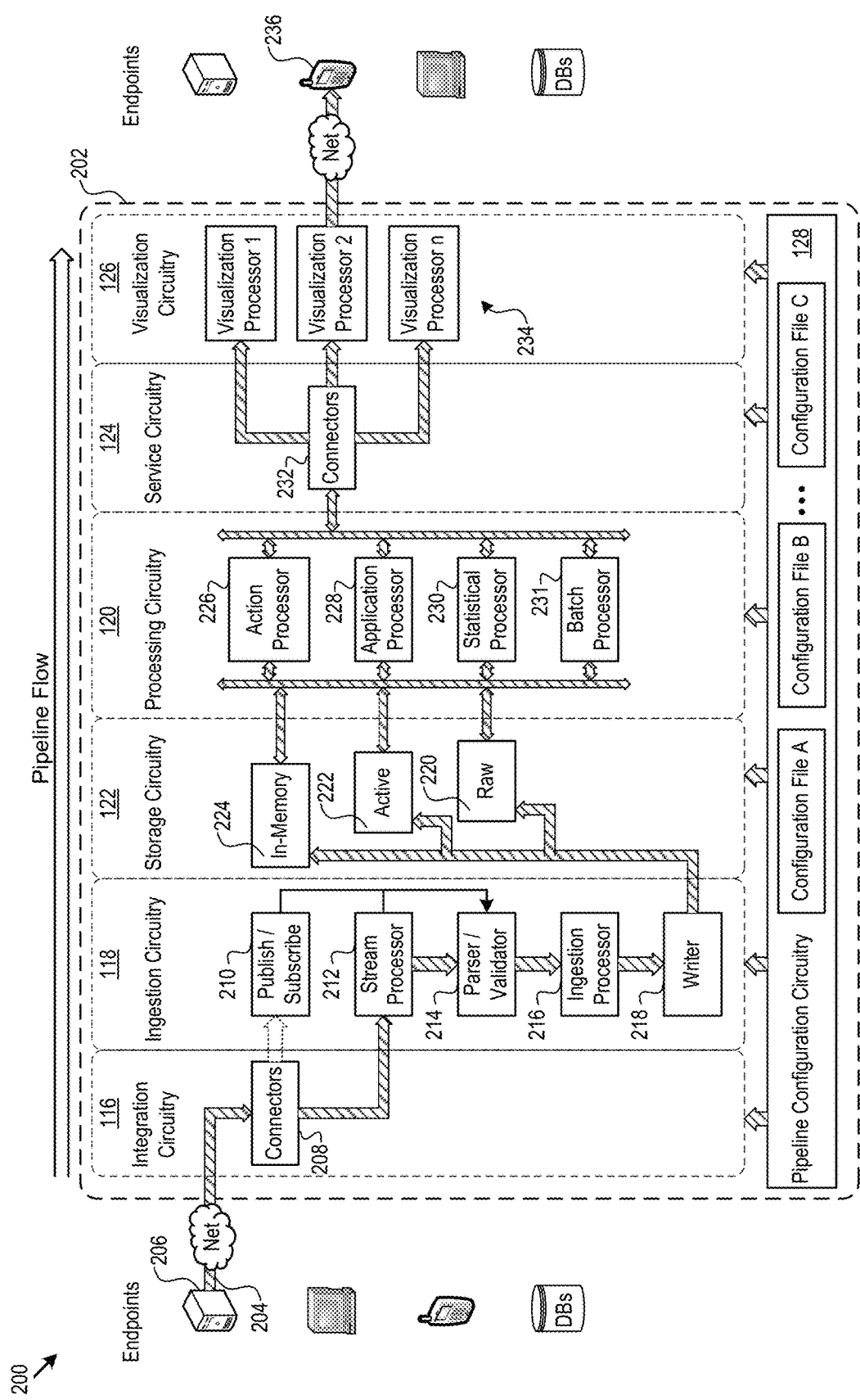
FIG. 2 shows a data pipeline architecture.

FIG. 2 shows data flow examples 200 with respect to the overall DPA architecture 202. The data stream 204 arrives from the streaming news server 206 and may include any type of data, such as stock and mutual fund price quotes. The DPA 114 processes the data stream 204 and delivers processed data (e.g., analytics or data visualizations) to the smartphone endpoint 236. The connectors 208 define interfaces within the integration circuitry 116 to accept the data stream 204 in the format defined by the streaming news server 206. The connectors 208 may implement interfaces to and from any desired data stream format via, e.g., Apache™ Camel™ interfaces. In the example in FIG. 2, the connectors 208 output Amazon Web Services (AWS)™ Kinesis Streams™ to the ingestion circuitry 118. The ingestion circuitry 118 includes the publish/subscribe message processor 210, e.g., an Apache™ Kafka™ publish/subscribe message processor as well as a stream processor 212, e.g., AWS™ Kinesis Streams™ processing circuitry.

The ingestion circuitry 118 may further include parser circuitry and validation circuitry 214. The parser may extract the structure of the data streams received from the connectors 208, and relay the structure and data to the ingestion processor 216. The implementation of the parser circuitry varies according to the formats of the data stream that the DPA 114 is setup to handle. As one example, the parser circuitry may include a CSV (comma-separated values) reader. As another example, the parser circuitry may include voice recognition circuitry and text analysis circuitry. Executing the parser circuitry is optional, for instance, when the data stream will be stored as raw unprocessed data.

The validator circuitry performs validation on the data in the data stream 204. For instance, the validator circuitry may perform pre-defined checks on fields within the data stream 204, optionally discarding or marking non-compliant fields. The pre-defined checks may be defined in a rule set in the DPA 114, for example, and customized to any specific data driven task the DPA 114 will perform for any given client or data processing scenario.

The ingestion circuitry 118 may include ingestion processing circuitry 216. The ingestion processing circuitry 216 may create and update derived data stored in the storage circuitry 122. The ingestion processing circuitry 216 may also apply pre-defined rules on the incoming data streams to create the derived data and store it in the storage circuitry 122. As one example, the ingestion processing circuitry 122 may create data roll-ups based, e.g., over a specified time or frequency. As another example, the ingestion processing circuitry 122 may create data by applying pre-determined processing rules for each data unit or data field in the data stream 204 passing through the ingestion circuitry 118. Further tasks executed by the ingestion processing circuitry 216 include aggregation of data and data compression.

The writer circuitry 218 stores the processed data, e.g., from any of the stream processor 212, parser/validator circuitry 214, and ingestion processor 216, into a repository layer defined in the storage circuitry 122. The writer circuitry 218 may selectively route the data between multiple destinations. The destinations may define a memory hierarchy, e.g., by read/write speed implemented to meet any pre-determined target processing bandwidths for the incoming data streams. For instance, the writer circuitry 218 may be configured to write data to: raw data storage 220, e.g., a Hadoop based repository, for batch analytics; an active analytics data storage 222, e.g., a Cassandra™ NoSQL repository to support ongoing analytics processing; and an in-memory data store 224, e.g., a Redis™ in-memory data structure store to support extremely fast (e.g., real-time or near real-time) data processing, with data stored, e.g. in DRAM, SRAM, or another very fast memory technology. The processed data streams may be stored in the memory hierarchy when, for instance, target processing bandwidth falls within or exceeds pre-defined bandwidth thresholds. In one implementation, the in-memory data store 224 provides higher read/write throughput than the active analytics data storage 222, which in turn provides higher read/write bandwidth than the raw data storage 220.

In the DPA 114, the processing circuitry 120 implements analytics, queries, aggregation, and any other defined processing tasks across the data sets stored in the storage circuitry 122. The processing tasks may, as examples, execute real-time analytics as the data stream 204 is received, as well as perform custom deep analytics on extensive historical datasets.

Expressed another way, the processing circuitry 120 may monitor and process the incoming data streams, e.g., in real-time. The processing circuitry 120, in connection with the other architecture components of the DPA 114, provides a framework for executing predictive analytics. In addition, the processing circuitry 120 executes rule based and complex event processing, aggregation, queries, and injection of external data, as well as performing streaming analytics and computation. In one implementation, the processing circuitry 120 includes a monitoring and alerting function that monitors incoming stream data, applies pre-defined rules on the data (e.g., Drools™ rules), and generates and sends alert messages, if a specific rule fires and species sending an alert via email, text message, phone call, GUI display, proprietary signal, or other mechanism.

The processing circuitry 120 may take its configuration from a configuration file. The configuration file may be a PMML file, for instance, provided by the pipeline configuration circuitry 128. The pipeline configuration circuitry 128 may dynamically deploy the configuration file to the processing circuitry 120 and other circuitry 116, 118, 122, 124, and 126 in the DPA 114. The configuration file decouples the processing from the specific pipeline structure in the DPA 114. That is, the configuration file may setup any of the processing by any of the circuitry 116-126 in a flexible and dynamic manner, to decouple the processing tasks from any specific underlying hardware.

The processing circuitry 120 may include a wide variety of execution systems. For instance, the processing circuitry 120 may include an action processor 226. The action processor 226 may be a rules based processing system, including a rule processing engine, a rules repository, and a rules management interface to the rule processing engine for defining and activating rules. The action processor 226 may be implemented with a JBoss Enterprise BRMS, for instance.

Another example execution system in the processing circuitry 120 is the application processor 228. The application processor 228 may be tailored to stream processing, for executing application tasks on data streams as compared to, e.g., batches of data. The application processor 228 may be implemented with Apache™ Spark Streaming™ processing.

The processing circuitry 120 shown in FIG. 2 also includes a statistical processor 230. The statistical processor 230 may be tailored specifically to statistical and data mining specific processing. In one implementation, the statistical processor 230 implements PMML processing for handling statistical and mining models defined by XML schema and combined into a PMML document. An additional example of processing circuitry 120 is the batch processor 231. The batch processor 231 may execute processing actions over large data sets, e.g., for processing scenarios in which real-time or near real-time speeds are not required.

The DPA 114 also provides mechanisms for connecting elements in the architecture to subsequent processing stages. For instance, the service circuitry 124 may define one or more connectors 232 that interface with the processing circuitry 120 and storage circuitry 122. The connectors 232 may be Apache™ Camel™ connectors.

There may be any number and type of subsequent processing stages. In the example of FIG. 2, the connectors 232 communicate data to the visualization circuitry 126. The visualization circuitry 126 instantiates any number of visualization processors 234. The visualization processors 234 may implement specific rendering functionality, including dynamic dashboards based on any desired pre-configured dashboard components, such as key performance indicator (KPIs). The visualization processors are not limited to generating dashboards, however. Other examples of visualization processors include processors for generating interactive charts, graphs, infographics, data exploration interfaces, data mashups, data roll-ups, interactive web-reports, drill-down multi-dimensional data viewers for, e.g., waterfall and control diagrams, and other visualizations.

The processing circuitry 116-126 in the DPA 114 may be viewed as a configurable pipeline architecture. The pipeline configuration circuitry 128 forms the backbone of the pipeline and may execute a wide variety of configurations on each part of the pipeline to tailor the execution of the DPA 114 for any specific role. For example, the pipeline configuration circuitry 128 may, responsive to any particular endpoint (e.g., the news server 206), configure the data parsing, validation, and ingestion processing that occurs in the integration circuitry 116 and ingestion circuitry 118, the type of memory resources used to store the ingested data in the storage circuitry 122, the type of processing executed on the data by the processing circuitry 120, and the types of visualizations generated by selected visualization processors 234.

The pipeline configuration circuitry 128 provides a centralized configuration supervisor for the DPA 114, which controls and configures each set of processing circuitry 116-126. In one implementation, a configuration file, e.g., a YAML file, may encode the processing configuration pushed to the DPA 114. The configuration file may control the pipeline to select between, e.g., multiple different processing modes at multiple different execution speeds (or combinations of such processing modes), such as batch processing, near real-time processing, and real-time processing of data streams; specify and configure the connectors 208 and 232 for the processing mode and speed selected; control the parsing, validation, and ingestion processing applied to the data streams; control the processing applied in the processing circuitry 120, including optionally dynamically deploying analytical models to the processing circuitry 120, and selecting the operational details of the action processor 226 (e.g., selecting the rule sets applied by the action processor 226), the application processors 228, and the statistical processor 230.

As another example, the configuration file may specify and cause creation of specific data models in the storage circuitry 122, e.g., to create specific table structures on startup of processing any given data streams. Further, the configuration file may cause dynamic creation of integration layers with REST service layers in, e.g., the Apache™ Camel™ connectors. As additional examples, the configuration file may specify and configure an initial dashboard visualization, e.g., based on KPIs specified in the configuration file, and specify options for agent based monitoring. For instance, a process executed in the pipeline configuration circuitry 128 may monitor the progress of data streams through the DPA 114 pipeline, with logging.

Figure 3:
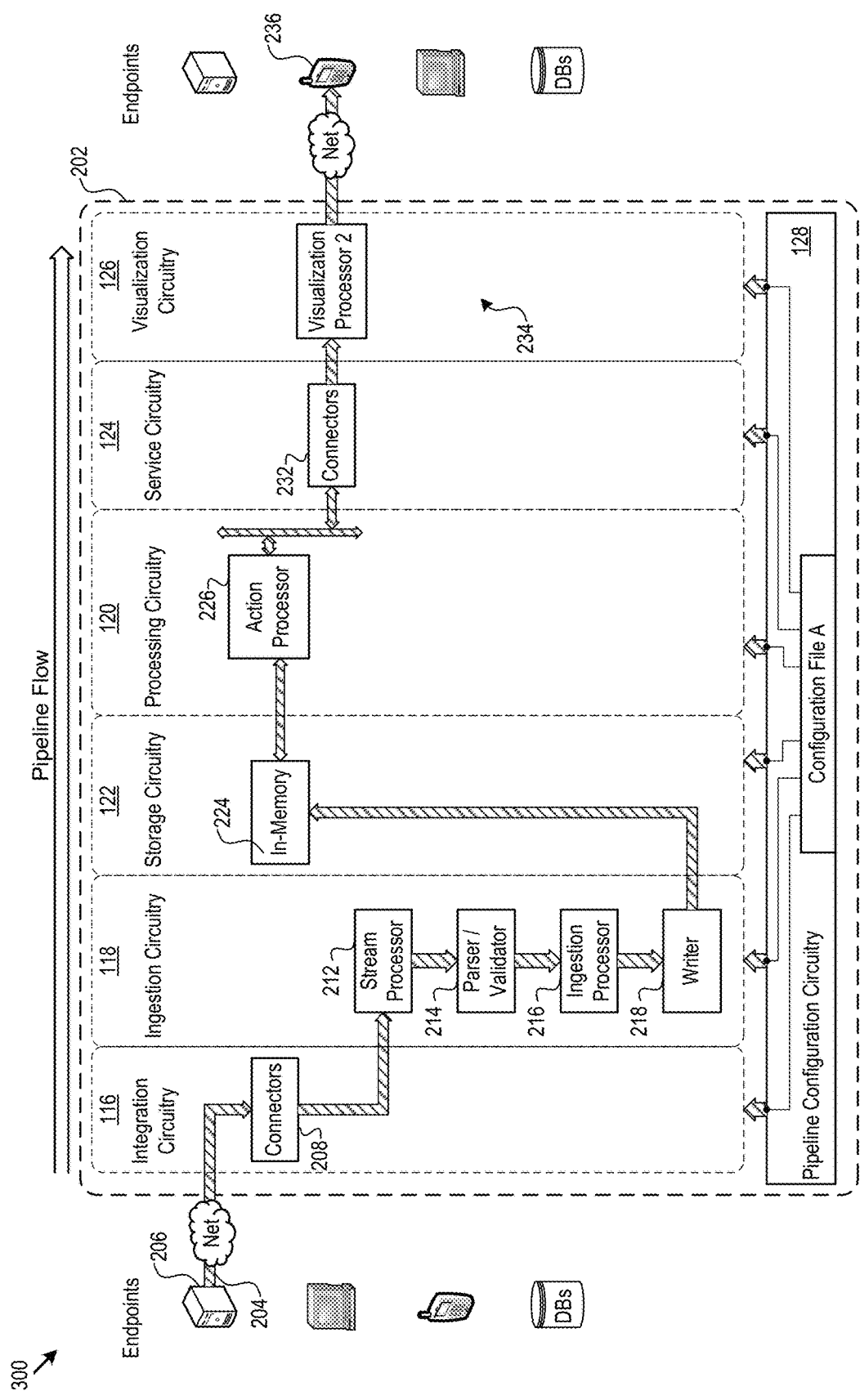
FIG. 3 shows a configuration of the data pipeline architecture according to a particular configuration applied by pipeline configuration circuitry.

FIG. 3 shows a configuration 300 of the data pipeline architecture according to a particular configuration applied by pipeline configuration circuitry 128. In this example, the configuration file A specifies the pipeline execution options for the pipeline stages. The pipeline configuration circuitry 128 reads the configuration file A and applies the execution options to each applicable set of circuitry 116-126.

Figure 4:
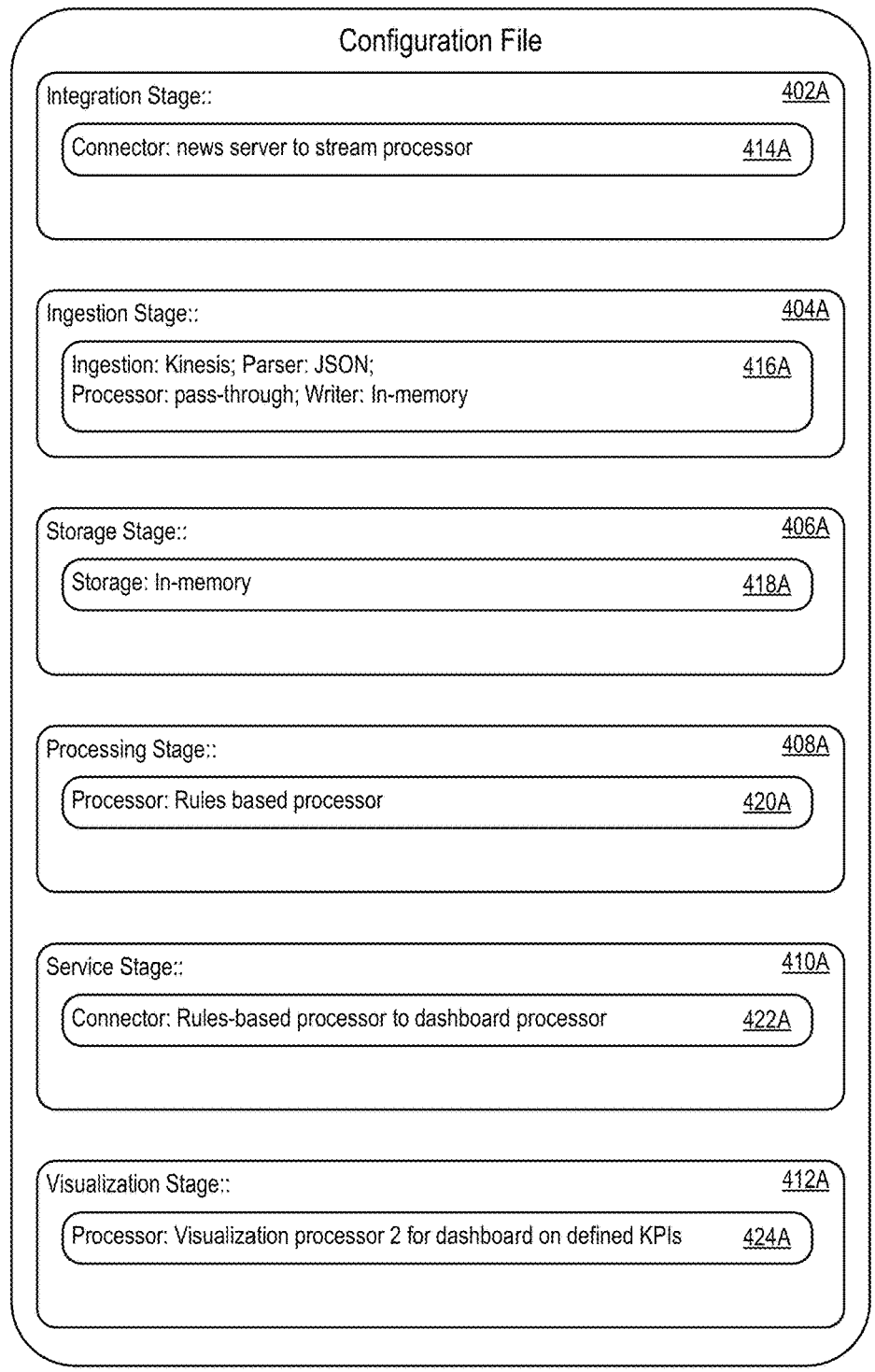
FIG. 4 shows a configuration file for the data pipeline architecture in FIG. 3.

FIG. 4 shows a corresponding example 400 of the configuration file A. The configuration file may be implemented as a YAML file, plain-text file, XML file, or any other type of file. In addition, the DPA 114 may define any set of criteria under which any given configuration file will apply. For instance, a configuration file may apply to specific sources of incoming data streams (e.g., a data stream from social media provider A), to specific types of data in the data streams (e.g., to sensor measurements), to specific times and dates (e.g., to use real-time processing during off-peak times when demand is low), to specific clients of the DPA 114 processing (e.g., specific client data streams are configured to real-time processing, or batch processing), or any other criteria.

The example 400 shows specification sections, including an integration stage section 402A, ingestion stage section 404A, storage stage section 406A, processing stage section 408A, service stage section 410A, and visualization stage section 412A. There may be additional or different sections, and configurations need not include every section, relying instead (for example) on default processing configurations applied to each processing element in the pipeline.

Within the specification sections are pipeline configuration entries. FIG. 4 shows an integration configuration entry 414A within the integration stage section 402A an ingestion configuration entry 416A within the ingestion stage section 404A, a storage configuration entry 418A within the storage stage section 406A, a processing configuration entry 420A within the processing stage section 408A, a service configuration entry 422A within the service stage section 410A, and visualization configuration entry 424A within the visualization stage section 412A. The configuration entries 414A-424A specify the pipeline execution options for one or more stages of the DPA 114.

In the example of FIGS. 3 and 4, the ingestion stage section 402A has specified using a connector in the integration circuitry 116 that accepts data streams in the format used by the news server 206, and outputs a data stream compatible with the stream processor 212. The ingestion stage section 404A specifies that the ingestion circuitry 118 will use Kinesis Streams™ through the stream processor 212, with the parser 214 configured for java script object notation (JSON), pass-through ingestion processing 216, and that the writer circuitry 218 will output ingested data to the in-memory data store 224 for very fast processing access.

The storage stage section 406A specifies the use of the in-memory data store 224 in the storage circuitry 122, and may allocate a specific size or block of memory, for example. The processing stage section 408A specifies execution of a rules based processor, e.g., via the action processor 226. The processing stage section 408A may also specify or provide the rules that the rules based processor will execute, e.g., via a uniform resource identifier (URI) into a memory or database in the DPA 114, or via a rules section in the configuration file. The initial pipeline stages are thereby setup for extremely fast, e.g., real-time or near real-time, processing of data streams with rule-based analysis.

The service stage section 410A specifies a connector in the service circuitry 124 between the rules-based processor and a dashboard processor in the visualization circuitry 126. The visualization stage section 412A specifies the visualization processor 2 specifically for rendering the dashboard on defined KPIs. The KPIs may be defined in another section of the configuration file, for example, or pre-configured in another memory or database in the DPA 114 for access by the visualization circuitry 126 at a specified URI. The visualization processor 2, in this example, transmits the dashboard to the smartphone endpoint 236.

Figure 5:
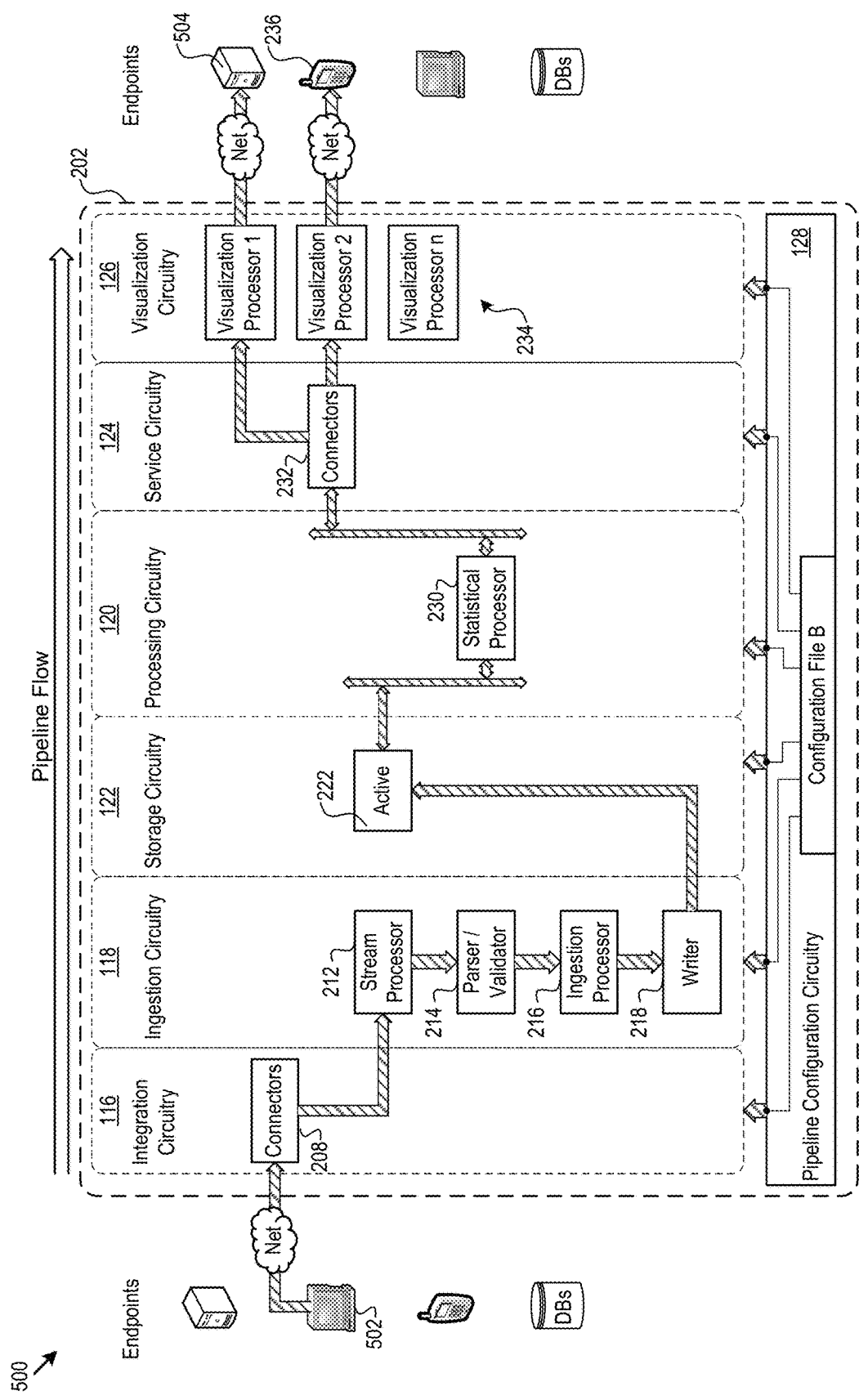
FIG. 5 shows another example configuration of the data pipeline architecture according to a particular configuration applied by pipeline configuration circuitry.
Figure 6:
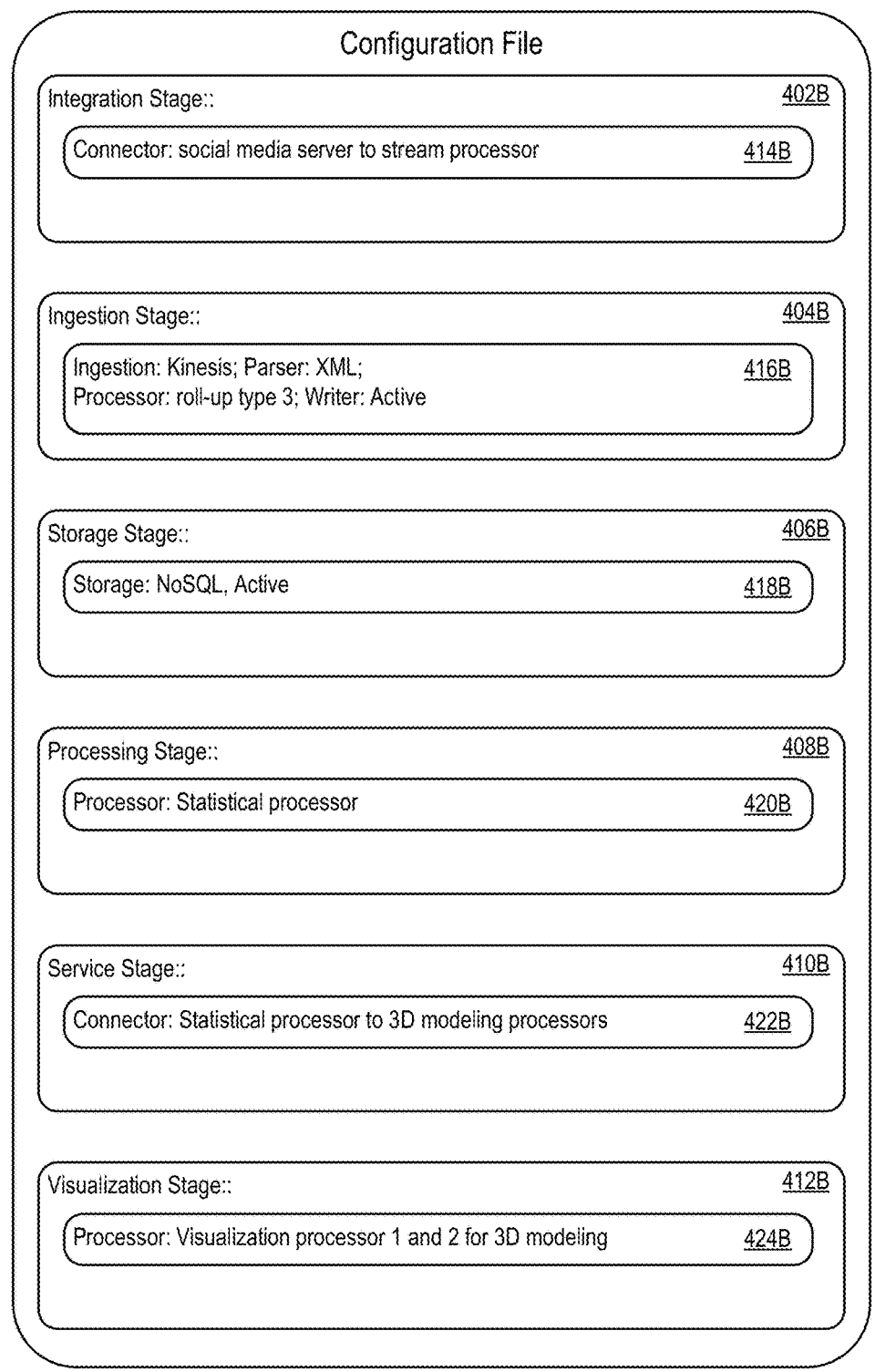
FIG. 6 shows a configuration file for the data pipeline architecture in FIG. 5.

FIG. 5 shows another example configuration 500 of the DPA 114 for a different data stream, as applied by pipeline configuration circuitry 128. In this example, the configuration file B specifies the pipeline execution options for the pipeline stages. FIG. 6 shows a corresponding example 600 of the configuration file B. The example 600 shows the specification sections described above, including an integration stage section 402B, ingestion stage section 404B, storage stage section 406B, processing stage section 408B, service stage section 410B, and visualization stage section 412B. As with any of the configuration files, there may be additional or different sections (e.g., a model section that defines or specifies via URI an analytical model for the processing circuitry 120). Configuration files need not include every section and may rely on default processing configurations applied to each processing element in the pipeline. The configuration entries 414B-424B specify the pipeline execution options for one or more stages of the DPA 114.

In the example of FIGS. 5 and 6, the ingestion stage section 402B has specified using a connector in the integration circuitry 116 that accepts data streams in the format used by the social media server 502, and outputs a data stream compatible with the stream processor 212. The ingestion stage section 404B specifies that the ingestion circuitry 118 will use Kinesis Streams™ processing performed by the stream processor 212, with the parser 214 configured for XML parsing, data roll-up type 3 ingestion processing 216, and that the writer circuitry 218 will output ingested data to the active analytics data store 226.

The storage stage section 406B specifies the instantiation of a NoSQL data store in the active analytics data store 226 in the storage circuitry 122. The processing stage section 408B specifies execution of the statistical processor 230, e.g., for data mining the ingested data to determine trends for targeted advertising. The initial pipeline stages are thereby setup for an ongoing, near real-time, processing of data streams with data mining analysis.

The service stage section 410B specifies a connector in the service circuitry 124 between the statistical processor and a 3D modeling processor in the visualization circuitry 126. The visualization stage section 412B specifies using the visualization processors 1 and 2 specifically for 3D modeling on the processed data. The visualization processors 1 and 2, in this example, transmit the 3D models to the targeted advertising system 504 and to the smartphone endpoint 236.

Figure 7:
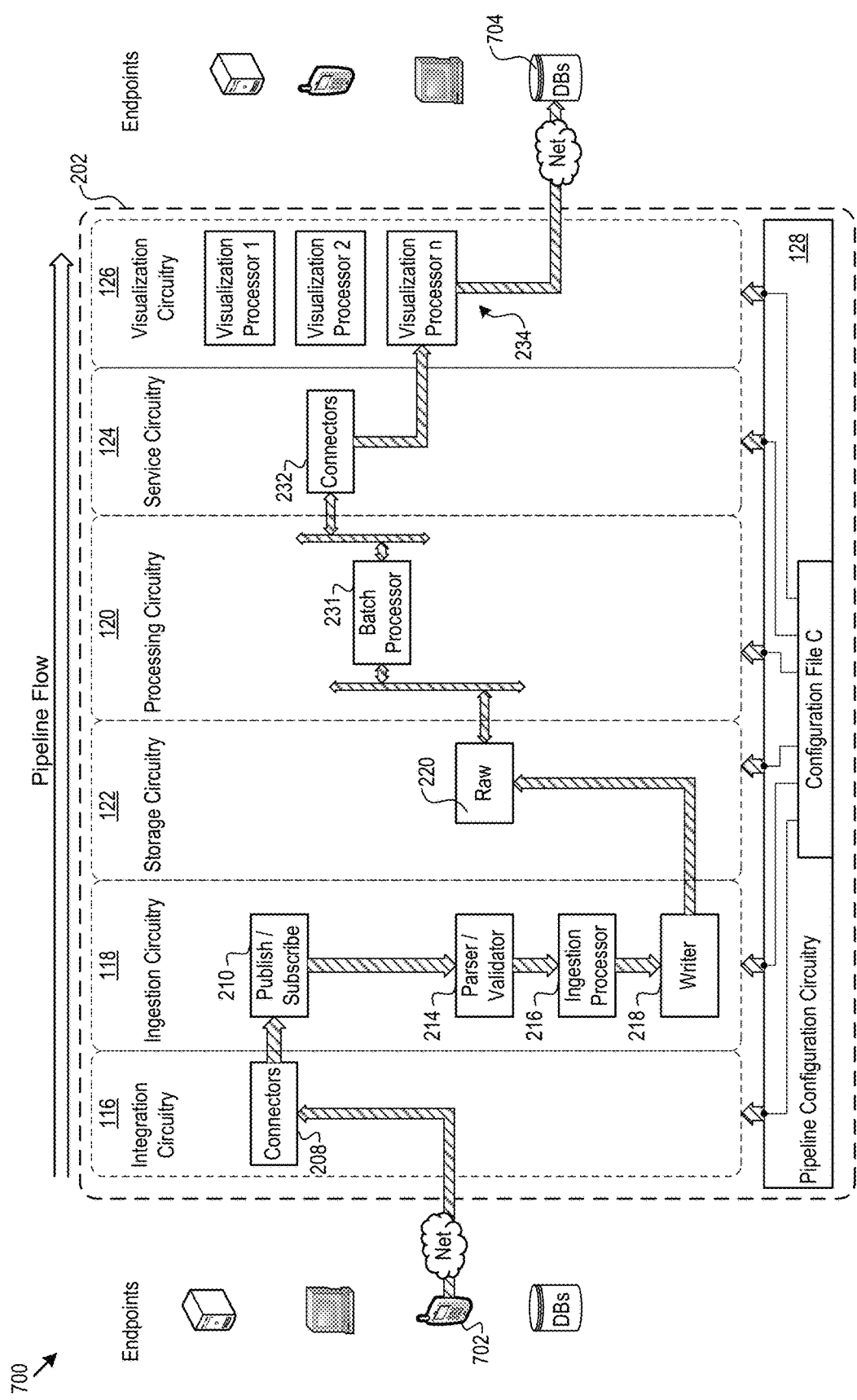
FIG. 7 shows a third configuration of the data pipeline architecture according to a particular configuration applied by pipeline configuration circuitry.
Figure 8:
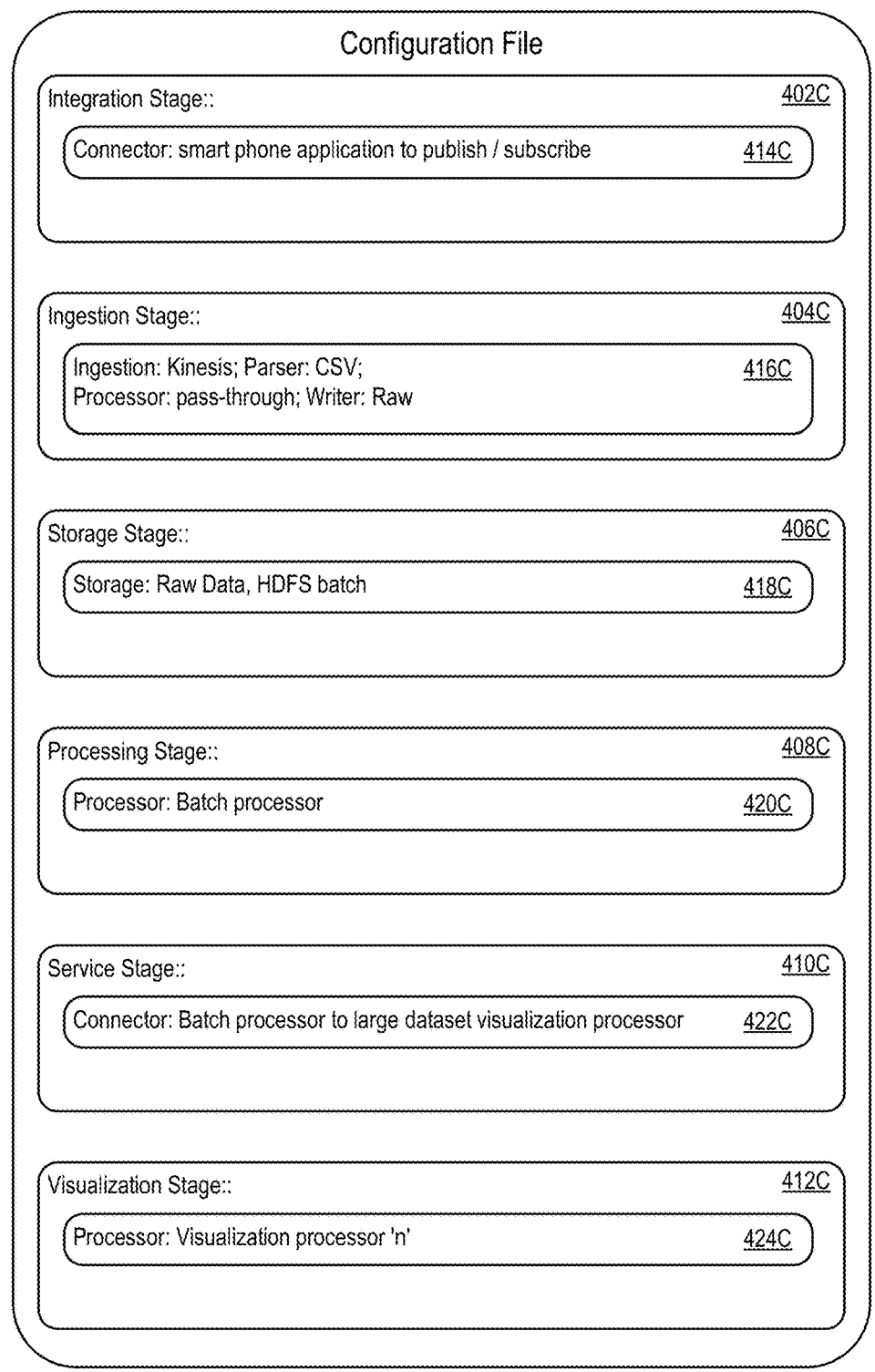
FIG. 8 shows a configuration file for the data pipeline architecture in FIG. 7.

FIG. 7 shows a third example configuration 500 700 the DPA 114 for applying custom processing to another type of data stream. In this example, the configuration file C specifies the pipeline execution options for the pipeline stages in the DPA 114. FIG. 8 shows a corresponding example 800 of the configuration file C. The example 800 shows the specification sections 402C-412C, as described above. The configuration entries 414C-424C specify pipeline execution options within the specification sections 402C-412C for the stages of the DPA 114.

In the example of FIGS. 7 and 8, the ingestion stage section 402C has specified using a connector in the integration circuitry 116 that accepts data streams in the format used by the smart phone application 702, and outputs a data stream compatible with the publish/subscribe message processor 210. The ingestion stage section 404C specifies that the ingestion circuitry 118 will use Kinesis Streams™ processing performed by the stream processor 212, with the parser 214 configured for CSV parsing, and pass-through ingestion processing 216. The ingestion stage section 404C further specifies that the writer circuitry 218 will output ingested data to the raw data storage 220.

In this example, the storage stage section 406C specifies an HDFS distributed java-based file system within the data management layer of Apache™ Hadoop for batch computation as the raw data storage 220 in the storage circuitry 122. The processing stage section 408C specifies execution of the batch processor 231. As one example, the batch processor 231 may perform data intensive map/reduce functions on extensive datasets across batches of data.

The service stage section 410C specifies a connector in the service circuitry 124 between the batch processor 231 and a large dataset visualization processor provided by the visualization circuitry 126. The visualization stage section 412C specifies using the visualization processor 'n' specifically for generating large dataset graphical representations on the processed data. The visualization processor 'n' transmits the rendered visualizations to a historical database 704.

Expressed another way, the pipeline configuration circuitry 128 provides a centralized configuration supervisor for the DPA 114. Configuration settings, e.g., given in a configuration file, specify the processing configuration for pipeline stages in the DPA 114. The configuration settings select between, e.g., multiple different processing modes at multiple different execution speeds (or combinations of such processing modes), including batch processing, near real-time processing, and real-time processing of data streams. The configuration settings may also control and configure connectors, parsing, validation, and ingestion processing applied to the data streams and control and configure the processing applied by the processing circuitry 120. The configuration setting may dynamically deploy, e.g., analytical models to the processing circuitry 120, rule sets for the action processor 226, and other operational aspects of the processing circuitry 120. The DPA 114 provides a whole full-scale customizable and configurable data processing pipeline architecture that may be configured for execution on a per-data stream basis through the centralized control by the pipeline configuration circuitry 128.

FIG. 9 shows a first section 900 of a YAML configuration file for the data pipeline architecture, and FIG. 10 shows a second section 1000 of the YAML configuration file for the data pipeline architecture. FIGS. 9 and 10 provide a specific example, and any configuration file may vary widely in form, content, and structure.

The first section 900 includes a Processing Type section 902. The "processing:" specifier selects between predefined processing types, e.g., Spark-Data-Ingestion, Spark-Data-Analytics, Storm-Data-Ingestion, and Storm-Data-Analytics. The pipeline configuration circuitry 128, responsive to the processing specifier, configures, e.g., the integration circuitry 116 and the ingestion circuitry 118 to implement the processing actions and data stream flow. For instance, when the processing specifier is "Spark-Data-Ingestion", the configuration circuitry 128 may instantiate or otherwise provide for data stream processing specific to Apache™ Spark data processing.

The first section 900 also includes a Deployment Model section 904. The "deployment:" specifier may be chosen from predefined deployment types, e.g., AWS, Azure, and On-Premise. The pipeline configuration circuitry 128 may execute configuration actions responsive to the deployment specifier to setup the pipeline stages in the DPA for any given configuration, e.g., a configuration specific to the expected data stream format or content for AWS.

The Persistence section 906 may include a "technique:" specifier to indicate a performance level for the DPA, e.g., batch processing, near-real time (lambda), or real-time (ultra-lambda). The pipeline configuration circuitry 128 modifies the storage circuitry 122 responsive to the Persistence section 906. For instance, for higher performance configurations (e.g., near-real time), the pipeline configuration circuitry 128 may establish in-memory 224 data stores for processing rules and analytics, with the data in the in-memory 224 data store flushed to the active store 222 on a predetermined schedule. For other performance configurations (e.g., near-real time), the pipeline configuration circuitry 128 may store data in the active store 222, then flush that data to the raw data store 220 (e.g., HDFS). As another option, the technique may specify a mix of performance modes, responsive to which the pipeline configuration circuitry 128 stores the data to be processing in the in-memory store 224, and also in the active store 222. In this scenario, the DPA 114 may flush the data into the raw data store 220 when a predefined condition is met, e.g., after a threshold time, size, or time+size is met.

The Sources section 908 may include a "connector:" specifier to inform the DPA 114 about the source of the data streams. The connector options may include source specifiers such as Kinesis, Kafka, and Flume, as a few examples. The Sources section 908 may further specify connection parameters, such as mode, username, password, URLs, or other parameters. The Modules section 910 may specify parses to implement on the data stream, e.g., in the integration circuitry 116 and ingestion circuitry 118. Similarly, the Modules section 910 may specify parsers 912 (e.g., JSON, CSV, or XML) and transformers 914 to implement on the data stream in the integration circuitry 116 and the ingestion circuitry 118.

In the example shown in FIG. 9, a "parser:" specifier directs the DPA 114 to use a JSON parser, with metadata configuration specified at "com.accenture.analytics.real-time.DmaDTO". The "function:" specifiers direct the DPA 114 to perform specific actions, e.g., date parsing on specific data fields in the data stream, or any type of custom processing, again on a specified data field in the data stream. Similarly, the "transformer:" specifier directs the DPA 114 to use functions for transformation, e.g., stand-alone functions available in pre-defined library. Two examples are the date-transformer function and the epoch-transformer function specified to act on specific fields of the incoming data stream.

The Analytical Model section 1002 directs the DPA 114 to perform the specified analytics 1004 in a given mode, e.g., "online" mode or "offline mode". For online mode, the pipeline configuration circuitry 128 may configure the DPA 114 to perform analytics on the data stream as it arrives. For offline mode, the pipeline configuration circuitry 128 may configure the DPA 114 to perform analytics on static data saved on disc in the storage circuitry 122. For example in offline mode, the DPA 114 may execute Java based Map-Reduce/Pig scripts for analytics on HDFS data.

In some implementations, the configuration file may use a Business Rules section 1006 to specify that the processing circuitry 120 apply particular rules to the data stream. The Business Rules section 1006 may specify, e.g., online or offline execution as noted above. The Business Rules section 1006 may further specify a rules file 1008 in which the processing circuitry 120 should retrieve the rules to apply.

The Loader section 1010 may be included to specify options for data persistence. For instance, the Loader section 1010 may specify storage specific metadata for the persistence, e.g. to map data to particular data stores according to the metadata. The "rawdatastorage" parameter may specify, e.g., a database to JSON mapping (or any other type of mapping) in connection with the persistence operation.

Further, the configuration file may include any number of Visualization sections 1012. The Visualization sections 1012 may specify processing options for the visualization circuitry 126. Example options include Dashboard type, e.g., Basic or Advanced; Visualization types, e.g., pie chart, block chart, or Gantt chart; Visualization layout, e.g., dashboard or spreadsheet. Note also that the configuration file may include a User authentication section 1014, which provides username and password (or other credentials) for use by the DPA 114 to allow access or use by certain people of the DPA 114.

Figure 11:
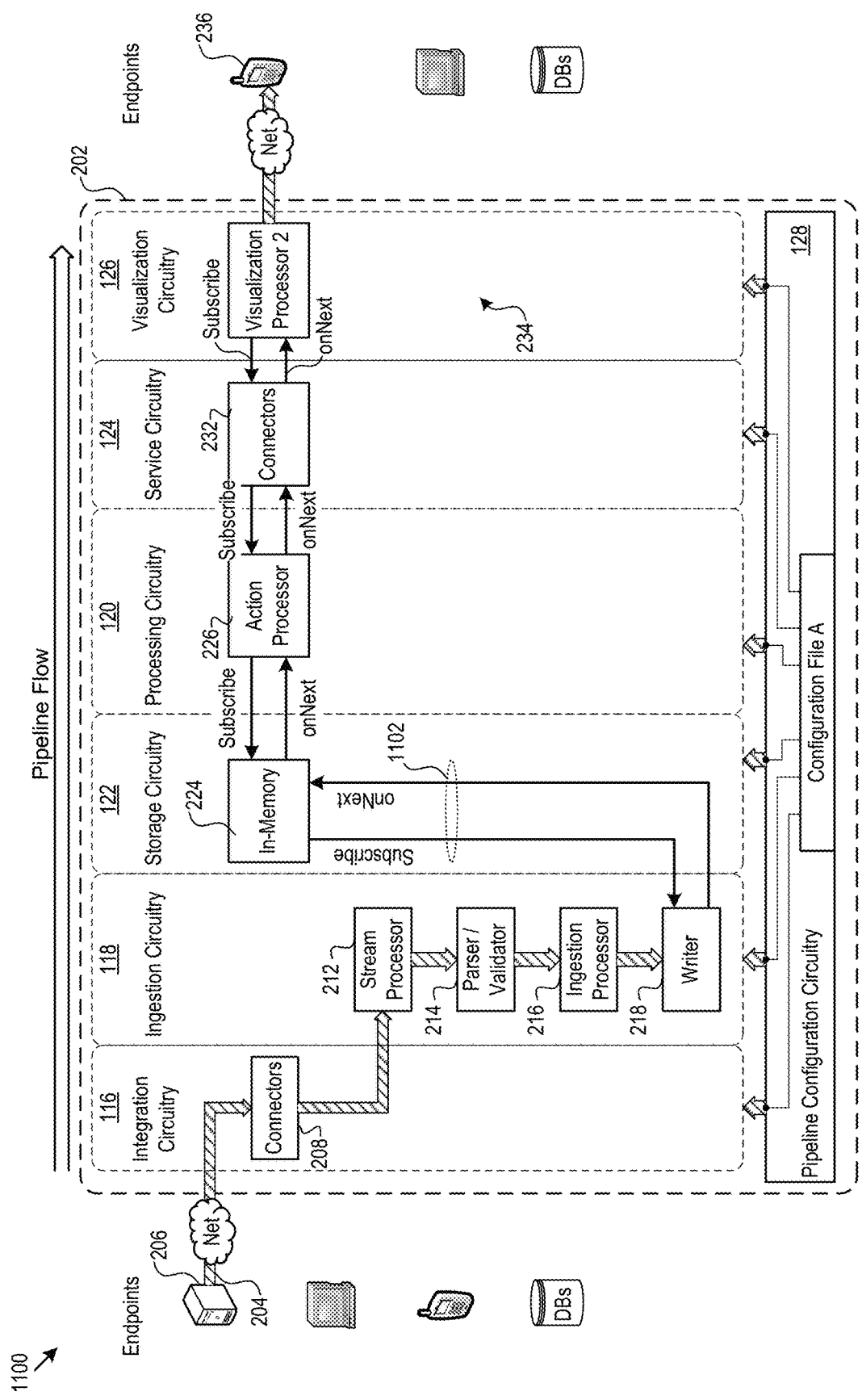
FIG. 11 shows a data pipeline architecture in which the processing stages include subscribe and publish interfaces for processing asynchronous data flows.

FIG. 11 shows a data pipeline architecture 1100 in which the processing stages include subscribe and publish interfaces for processing asynchronous data flows. For instance, the pipeline stages may implement Reactive Java subscription and events to create a pipeline architecture that processes asynchronous data flow through the pipeline stages. In such an implementation, any given component of any given stage performs its processing in a reactive manner, when a prior stage has generated an output for consumption by the following stage.

As an example, FIG. 11 shows a reactive interface 1102 defined between the storage circuitry 122 and the ingestion circuitry 118. In particular, the reactive interface 1102 establishes a subscription relationship between the in-memory data store 224 and the writer circuitry 218. Additional reactive interfaces are present between the processing circuitry 120 and the storage circuitry 122, the service circuitry 124 and the processing circuitry 120, and the visualization circuitry 126 and the service circuitry 124.

Note that reactive interfaces may be defined between any pipeline components regardless of stage. One consequence is that the reactive interfaces may implement non-serial execution of pipeline stages. For instance, the processing circuitry 120 may establish a reactive interface to the writer circuitry 218 in addition to the in-memory data storage 224. As a result, the processing circuitry 120 may listen to, observe, and perform processing on an event emitted by the writer circuitry 218 without waiting for the in-memory data storage 224.

Through the reactive interface 1102, the in-memory data store 224 receives an event notification when the writer circuitry 218 has completed a processing task and has an observable element of work product ready. Expressed another way, the in-memory data store 224 listens to the stream of objects completed by the writer circuitry 218 and reacts accordingly, e.g., by quickly storing the completed object in high speed memory. A stream may be any sequence of ongoing events ordered in time, and the stream may convey data (e.g., values of some type), errors, or completed signals.

The stream processing implemented by any of the pipeline components may vary widely. In some implementations for some components, one or more streams of observables may connected as inputs to other streams, streams may be merged to create a merged stream, streams may be filtered to retain only events of interest, or data mapping may run on streams to create a new stream of events and data according to any predefined transformation rules.

The processing in the data pipeline architecture 1100 captures the events asynchronously. For instance, with reference again to the in-memory data storage 224, it may define a value function that executes when a value observable is emitted by the writer circuitry 218 (e.g., a function that stores the value in high-speed memory), an error function that executes when the writer circuitry 218 emits an error observable, and a completion function that executes when the writer circuitry 218 emits a completion observable. These functions are the observers that subscribe to the stream, thereby listening to it.

Figure 12:
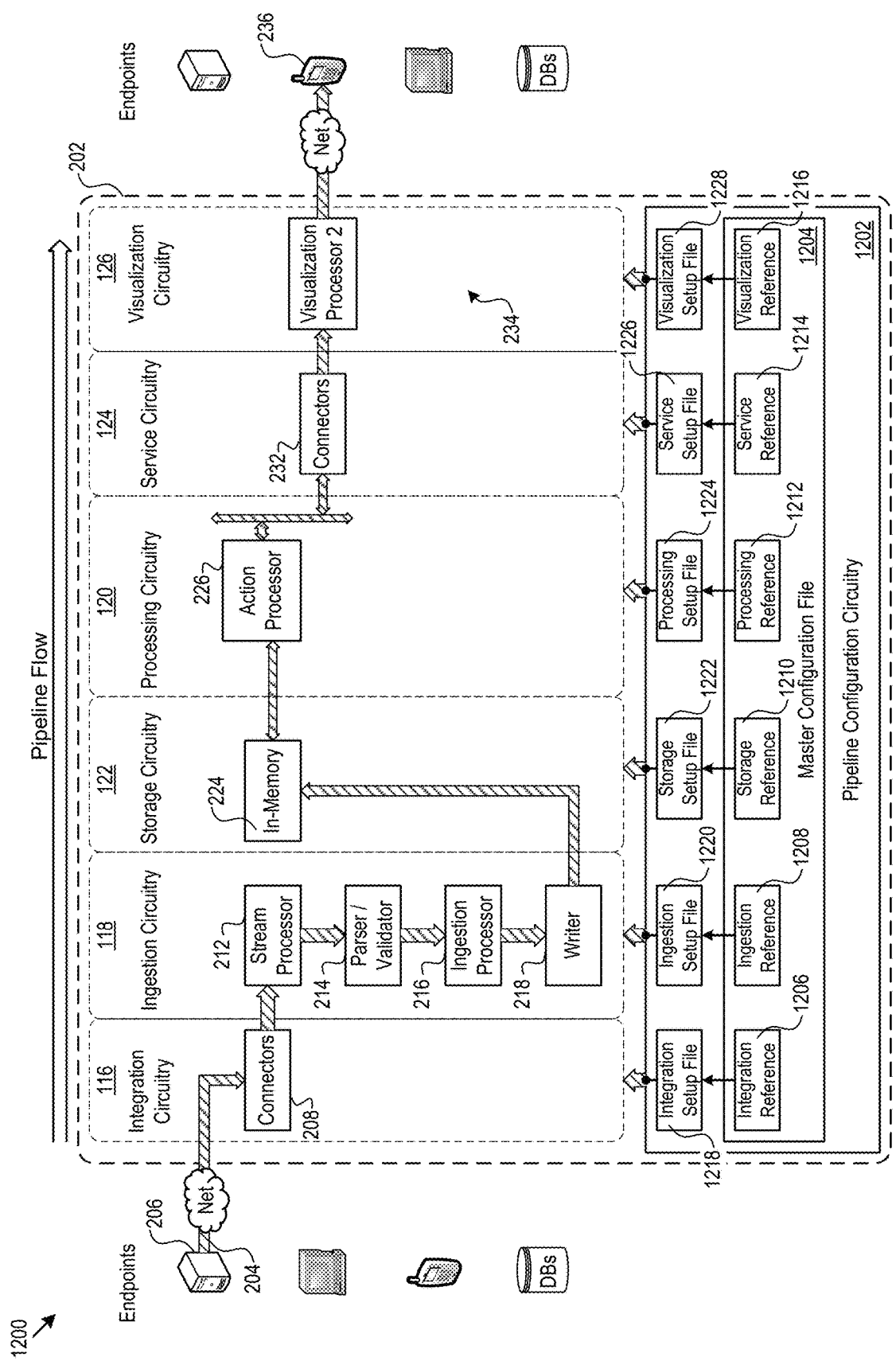
FIG. 12 shows a data pipeline architecture with a configuration established by a referential XML master configuration file.

FIG. 12 shows a data pipeline architecture 1200 with a configuration established by a referential master configuration file 1204 (e.g., an XML or YAML file) processed by the pipeline configuration circuitry 1202. The referential master configuration file 1204 has established the same pipeline processing as shown in FIG. 3. The architecture of the master configuration file 1204 is different, however, as explained below In particular, the master configuration file 1204 has an internal structure that references additional, external, configuration files. In the example in FIG. 12, the master configuration file 1204 itself includes references to the external configuration files, including an integration reference 1206, an ingestion reference 1208, a storage reference 1210, a processing reference 1212, a service reference 1214, and a visualization reference 1216. These references, respectively, point to the following configuration files: an integration setup file 1218, an ingestion setup file 1220, a storage setup file 1222, a processing setup file 1224, a service setup file 1226, and a visualization setup file 1228. Any of the setup files may be XML, YAML, or other type of file.

The configuration files in FIG. 12 correspond to individual processing stages in the pipeline, and may address configuration options throughout an entire stage. However, configuration files referenced by the master configuration file 1204 may correspond to any desired level of granularity of control and configuration. As examples, there may be individual configuration files defined to configure the visualization processor 2, the action processor 228, the in-memory storage 224, and the stream processor 212.

The external configuration files may provide parameter settings and configuration options for any component in the data pipeline architecture (e.g., the visualization processors) or for bundles of components that may be present in any pipeline stage (e.g., the ingestion stage 118). That is, the master configuration file 1204 references configuration settings specified in other files for the configuration of pipeline stages in the DPA 1200. As just a few examples, the configuration settings select between, e.g., multiple different processing modes at multiple different execution speeds (or combinations of such processing modes), including batch processing, near real-time processing, and real-time processing of data streams. The configuration settings may also control and configure connectors, parsing, validation, and ingestion processing applied to the data streams and control and configure the processing applied by the processing pipeline stage. The configuration setting may dynamically deploy, e.g., analytical models to the processing pipeline stage, rule sets for the processing stage, and other operational aspects. The DPA 1200 provides a whole full-scale customizable and configurable data processing pipeline architecture that may be configured for execution on a per-data stream basis through the centralized control by the master configuration file 1204.

As examples, Tables 1-10 show XML pseudocode configuration file sets.

The prediction master configuration file, shown in Table 1, of the first configuration file set (Tables 1-6), points to the analytics (Table 2), connector (Table 3), writeservice (Table 4), engine prediction (Table 5), and validator prediction (Table 6) XML files. Accordingly, within this example configuration file set, the prediction master configuration file of Table 1 may fill the role of the master configuration of FIG. 12 for the first configuration file set by referencing external files.

Table 1 below shows an example prediction master configuration file.

TABLE 1

Example prediction master configuration file.

```xml
<?xml version="1.0" encoding="UTF-8"?>
<!--
    This is the primary configuration file for RTAF pipeline.
        Purpose:
            1) Specify the building block/modules of the entire pipeline
            2) Specify the global configuration file holding configurable
                options for all the modules
            Date of creation:
                10th May, 2016
                version: 1.0
-->
<pipeline name="RtafPipeline">
    <!-- <configuration
        name="pipeline_config_prediction.properties"
        config_location="s3" bucket_name="aip-rtaf-pipeline-modules" /> -->
    <!-- <configuration
        name="pipeline_config_prediction.properties"
        config_location="dynamodb"
        bucket_name="arn:aws:dynamodb:us-east-1:533296168095:table/rtaf_aws_pipeline_config" /> -->
    <configuration
        name="pipeline_config_prediction.properties"
        arn="arn:aws:dynamodb:us-east-1:533296168095:table/rtaf_aws_pipeline_config" />
    <!-- <module name="connector"
        config="connector.xml" config_location = "classpath"
        bucket_name = "" /> -->
    <module name="connector"
        config="connector.xml" config_location = "s3"
        bucket_name = "aip-rtaf-pipeline-modules/prediction_pipeline" />
    <!-- <module name="validator"
        config="validator_prediction.xml"
config_location = "classpath"
        bucket_name = "" /> -->
    <module name="validator"
        config="validator_prediction.xml"
config_location = "s3"
        bucket_name = "aip-rtaf-pipeline-modules/prediction_pipeline" />
    <!-- <module name="analytics"
        config="analytics.xml"
        config_location = "classpath"
        bucket_name = "" /> --> <!-- bucket_name = "aip-rtaf-pipeline-modules" -->
    <module name="analytics"
        config="analytics.xml"
        config_location = "s3"
        bucket_name = "aip-rtaf-pipeline-modules/prediction pipeline" />
    <!-- <module name="rule_engine_prediction"
        config="rule_engine_prediction.xml"
        config_location="classpath" bucket_name=""/>
    -->
    <module name="rule_engine_prediction"
        config="rule_engine_prediction.xml"
        config_location="s3" bucket_name="aip-rtaf-pipeline-modules/prediction_pipeline"/>
    <!-- Write service module to persist raw data
    <module name="raw_data_writeservice"
        config="raw_data_writeservice.xml"
config_location = "classpath"
        bucket_name = "" /> -->
    <!-- Write service module to persist forecast data   -->
    <!-- <module name="prediction_writeservice"
        config="prediction_writeservice.xml"
config_location = "classpath"
        bucket_name = ""/> -->
```

TABLE 1-continued

Example prediction master configuration file.

```xml
    <module name="prediction_writeservice"
        config="prediction_writeservice.xml"
config_location = "s3"
        bucket_name = "aip-rtaf-pipeline-modules/prediction_pipeline" />
    <!-- <module name="analytics"
        config="https://s3.amazonaws.com/aip-rtaf-pipeline-modules/analytics/analytics_manifest.xml"
        config_location = "s3"
        bucket_name = "aip-rtaf-pipeline-modules" />
    -->
</pipeline>
```

Table 2 shows an example analytics XML file that is referenced in the example prediction master configuration file of Table 1.

TABLE 2

Example analytics XML file.

```xml
<?xml version="1.0" encoding="UTF-8"?>
<module name="analytics">
    <interests>
        <!--
            Any module defined with launcher category will be the starting component
                of the pipeline. In rare scenarios there can be multiple modules that needs
                to be started at the beginning
        -->
        <interest action="com.acn.rtaf.RealTimeAnalyticsFramework.framework.analytics"/>
        <!-- <interest category="launcher"/> -->
    </interests>
    <launcher class="com.acn.rtaf.framework.analytics.RtafAnalyticEngine"/>
    <successors>
        <interest action="com.acn.rtaf.RealTimeAnalyticsFramework.framework.rule_engine_prediction"/>
        <!--
        <interest action="com.acn.rtaf.RealTimeAnalyticsFramework.framework.parser">
            <interest action="a" />
            If the output of this module needs to be delivered to multiple
            modules specify them as successors here
        -->
    </successors>
</module>
```

Table 3 shows an example connector XML file that is referenced in the example prediction master configuration file of Table 1.

TABLE 3

Example connector XML file.

```xml
<?xml version="1.0" encoding="UTF-8"?>
<module>
    <interests>
        <!--
            Any module defined with launcher category will be the starting component
                of the pipeline. In rare scenarios there can be multiple modules that needs
                to be started at the beginning
        -->
        <interest
```

TABLE 3-continued

Example connector XML file.

```
action="com.acn.rtaf.RealTimeAnalyticsFramework.framewor
k.connector"/>
        <interest category="launcher"/>
    </interests>
    <launcher
class="com.acn.rtaf.framework.connector.RTAFConnector"/>
    <successors>
        <interest
action="com.acn.rtaf.RealTimeAnalyticsFramework.framewor
k.validator" />
        <!--
        If the output of this module needs to be delivered
to multiple
            modules specify them as successors here
            -->
    </successors>
</module>
```

Table 4 shows an example writeservice XML file that is referenced in the example prediction master configuration file of Table 1.

TABLE 4

Example writeservice XML file.

```
<?xml version="1.0" encoding="UTF-8"?>
<module>
    <interests>
        <!--
        Any module defined with launcher category will
be the starting component
            of the pipeline. In rare scenarios there can be
multiple modules that needs
            to be started at the beginning
            -->
        <interest
action="com.acn.rtaf.RealTimeAnalyticsFramework.framewor
k.writeservice.prediction_writeservice"/>
        <!--  <interest category="launcher"/>    -->
    </interests>
    <launcher
class="com.acn.rtaf.framework.dataservices.RTAFPersisten
ce"/>
    <successors>
        <!--                                <interest
action="com.acn.rtaf.RealTimeAnalyticsFramework.framewor
k.analytics" /> -->
        <!--
        If the output of this module needs to be delivered
to multiple
            modules specify them as successors here
            -->
    </successors>
</module>
```

Table 5 shows an example engine prediction XML file that is referenced in the example prediction master configuration file of Table 1.

TABLE 5

Example engine prediction XML file.

```
<?xml version="1.0" encoding="UTF-8"?>
<module>
    <interests>
        <!--
        Any module defined with launcher category will
be the starting component
            of the pipeline. In rare scenarios there can be
multiple modules that needs
            to be started at the beginning
            -->
```

TABLE 5-continued

Example engine prediction XML file.

```
        <interest
action="com.acn.rtaf.RealTimeAnalyticsFramework.framewor
k.rule_engine_prediction"/>
    </interests>
    <launcher
class="com.acn.rtaf.framework.rule.engine.manager.RTAFRu
leEngine"/>
    <successors>
        <interest
action="com.acn.rtaf.RealTimeAnalyticsFramework.framewor
k.writeservice.prediction_writeservice" />
        <!--
        If the output of this module needs to be delivered
to multiple
            modules specify them as successors here
            -->
    </successors>
</module>
```

Table 6 shows an example validator prediction XML file that is referenced in the example prediction master configuration file of Table 1.

TABLE 6

Example validator prediction XML file.

```
<?xml version="1.0" encoding="UTF-8"?>
<module>
    <interests>
        <!--
        Any module defined with launcher category will
be the starting component
            of the pipeline. In rare scenarios there can be
multiple modules that needs
            to be started at the beginning
            -->
        <interest
action="com.acn.rtaf.RealTimeAnalyticsFramework.framewor
k.validator"/>
        <!--  <interest category="launcher"/>    -->
    </interests>
    <launcher
class="com.acn.rtaf.framework.validator.RTAFValidator"/>
    <successors>
        <interest
action="com.acn.rtaf.RealTimeAnalyticsFramework.framewor
k.analytics" />
        <!--
        If the output of this module needs to be delivered
to multiple
            modules specify them as successors here
            -->
    </successors>
</module>
```

The second example configuration file set (Tables 7-10), may be used by the system to configure execution of data validations on raw data flows. The raw pipeline master configuration file shown in Table 7 may reference the raw connector (Table 8), raw writeservice (Table 9), and raw validator (Table 10) XML files.

Table 7 below shows an example raw pipeline master configuration file.

TABLE 7

Example raw pipeline master configuration file.

```
<?xml version="1.0" encoding="UTF-8"?>
<!--
    This is the primary configuration file for RTAF
pipeline.
```

TABLE 7-continued

Example raw pipeline master configuration file.

```
    Purpose:
        1)    Specify the building block/modules of the
entire pipeline
        2)    Specify the global configuration file
holding configurable
            options for all the modules
        Date of creation:
            10th May, 2016
        version: 1.0
-->
<pipeline name="RtafPipeline">
    <configuration
        name="pipeline_config_raw.properties"
        arn="arn:aws:dynamodb:us-east-
1:533296168095:table/RAW_CONFIGURATION" />
        <module name="connector"
            config="connector.xml" config_location = "s3"
            bucket_name        =        "aip-rtaf-pipeline-
modules/raw_pipeline" />
        <module name="validator"
            config="validator_raw.xml"       config_location   =
"s3"
            bucket_name        =        "aip-rtaf-pipeline-
modules/raw_pipeline" />
        <module name="raw_data_writeservice"
            config="raw_data_writeservice.xml"
config_location = "s3"
            bucket_name        =        "aip-rtaf-pipeline-
modules/raw_pipeline" />
</pipeline>
```

Table 8 shows an example raw connector XML file that is referenced in the example raw pipeline master configuration file of Table 7.

TABLE 8

Example raw connector XML file.

```
<?xml version="1.0" encoding="UTF-8"?>
<module>
    <interests>
        <!--
            Any module defined with launcher category will
be the starting component
                of the pipeline. In rare scenarios there can be
multiple modules that needs
                to be started at the beginning
        -->
        <interest
action="com.acn.rtaf.RealTimeAnalyticsFramework.framewor
k.connector"/>
            <interest category="launcher"/>
    </interests>
    <launcher
class="com.acn.rtaf.framework.connector.RTAFConnector"/>
        <successors>
            <interest
action="com.acn.rtaf.RealTimeAnalyticsFramework.framewor
k.validator" />
        <!--
            If the output of this module needs to be delivered
to multiple
                modules specify them as successors here
        -->
        </successors>
</module>
```

Table 9 shows an example raw writeservice XML file that is referenced in the example raw pipeline master configuration file of Table 7.

TABLE 9

Example raw writeservice XML file.

```
<?xml version="1.0" encoding="UTF-8"?>
<module>
    <interests>
        <!--
            Any module defined with launcher category will
be the starting component
                of the pipeline. In rare scenarios there can be
multiple modules that needs
                to be started at the beginning
        -->
        <interest
action="com.acn.rtaf.RealTimeAnalyticsFramework.framewor
k.writeservice.raw_data_writeservice"/>
            <!--  <interest category="launcher"/>       -->
    </interests>
    <launcher
class="com.acn.rtaf.framework.dataservices.RTAFPersisten
ce"/>
        <successors>
            <!--                                   <interest
action="com.acn.rtaf.RealTimeAnalyticsFramework.framewor
k.analytics" /> -->
        <!--
            If the output of this module needs to be delivered
to multiple
                modules specify them as successors here
        -->
        </successors>
</module>
```

Table 10 shows an example raw validator XML file that is referenced in the example raw pipeline master configuration file of Table 7.

TABLE 10

Example raw validator XML file.

```
<?xml version="1.0" encoding="UTF-8"?>
<module>
    <interests>
        <!--
            Any module defined with launcher category will
be the starting component
                of the pipeline. In rare scenarios there can be
multiple modules that needs
                to be started at the beginning
        -->
        <interest
action="com.acn.rtaf.RealTimeAnalyticsFramework.framewor
k.validator"/>
            <!--  <interest category="launcher"/>       -->
    </interests>
    <launcher
class="com.acn.rtaf.framework.validator.RTAFValidator"/>
        <successors>
            <!--                                   <interest
action="com.acn.rtaf.RealTimeAnalyticsFramework.framewor
k.rule_engine_raw"/> -->
            <!--                                   <interest
action="com.acn.rtaf.RealTimeAnalyticsFramework.framewor
k.writeservice.raw_data_writeservice" /> -->
            <interest
action="com.acn.rtaf.RealTimeAnalyticsFramework.framewor
k.writeservice.raw_data_writeservice" />
        <!--
            If the output of this module needs to be delivered
to multiple
                modules specify them as successors here
        -->
        </successors>
</module>
```

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
 a data stream processing pipeline circuitry configured to dynamically implement a pipeline flow controlled and configured by configuration settings specified in a stored configuration file, the pipeline flow defined by an endpoint selection, the endpoint selection including:
  a selected input endpoint of a defined input group of input endpoints; and
  a selected output endpoint of a defined output group of output endpoints;
 the data stream processing pipeline circuitry including:
  an ingestion circuitry stage configured to select among ingestion options and configure a selected ingestion option and a writer circuitry option, the writer circuitry option configured to output ingested data according to a storage option specified in the configuration settings and the selected ingestion option specified in the configuration settings, the ingestion options including:
   stream processor reception configured as a first datastream processor; and
   publish-subscribe protocol reception configured as a second datastream processor, the first datastream processor and the second datastream processor being different datastream processors;
  a storage circuitry stage configured to select and implement the storage option specified in the configuration settings, from among different storage options in a defined memory hierarchy;
  a processing circuitry stage configured to select among processing options according to an execution speed specified in the configuration settings and control processing of a selected processing option by selection of operational details of the selected processing option including:
   batch processing selected in response to the execution speed specified in the configuration settings being other than real-time processing or near real-time processing; and
   in-memory processing at a speed faster than that of batch processing selected in response to the execution speed specified in the configuration settings being real-time processing or near real-time processing; and
  a visualization circuitry stage configured to select among visualization options by selecting a specific one of multiple visualization processors, each of the visualization processors configured with different rendering functionality; and
 the data stream processing pipeline circuitry further configured to, at a configuration stage and responsive to the configuration file, select a specific option combination of pipeline stages to create the pipeline flow from among the ingestion, storage, processing, and visualization options based on the endpoint selection and apply pipeline execution options specified in the configuration file to at least some of the pipeline stages.

2. The system of claim 1, where the defined input group of input endpoints include, a database storage endpoint, a personal computer endpoint, a mobile device endpoint, a server endpoint, or any combination thereof.

3. The system of claim 1, where the defined output group of output endpoints include, a database storage endpoint, a personal computer endpoint, a mobile device endpoint, a server endpoint, or any combination thereof.

4. The system of claim 1, where:
 the selected input endpoint includes a mobile device endpoint;
 the selected output endpoint includes a database storage endpoint; and
 the specific option combination includes publish-subscribe protocol reception, raw storage, batch processing, and a visualization processor selected for a database.

5. The system of claim 1, where the configuration file specifies the specific option combination for the endpoint selection.

6. The system of claim 1, where the configuration file is configured to cause setup of a reactive messaging system by establishment of a subscription relationship among the ingestion circuitry stage, the storage circuitry stage, the processing circuitry stage, or any combination thereof.

7. The system of claim 6, where the configuration file is configured to cause setup of the reactive messaging system in response to an asynchronous input data flow to the data stream processing pipeline circuitry.

8. The system of claim 1, where the configuration file is configured to cause setup of a dashboard visualization configured to provide monitoring of progress of data streams through the data stream processing pipeline circuitry.

9. A method comprising:
in a data stream processing pipeline circuitry dynamically implement a pipeline flow controlled and configured by configuration settings specified in a configuration file, the pipeline flow defined by an endpoint selection, the endpoint selection including:
a selected input endpoint of a defined input group of input endpoints; and
a selected output endpoint of a defined output group of output endpoints;
selecting, responsive to the configuration file, a specific option combination of pipeline stages in a pipeline based on the endpoint selection and controlling and configuring at least some of a plurality of stages of the pipeline as specified in the configuration file by:
at an ingestion circuitry stage of the data stream processing pipeline circuitry, selecting an ingestion option from among ingestion options, the ingestion option specified by the configuration settings, and the ingestion options including:
stream processor reception configured as a stream processor; and
publish-subscribe protocol reception configured as a message processor; and
configuring a writer circuitry option to output ingested data according to a storage option specified in the configuration settings;
at a storage circuitry stage of the data stream processing pipeline circuitry, selecting and implement the storage option specified in the configuration settings, from among different storage options in a defined memory hierarchy;
at a processing circuitry stage of the data stream processing pipeline circuitry, selecting among different processing options including:
batch processing when the configuration file specifies other than real-time, or near real-time processing; and
in-memory processing at a speed faster than that of batch processing when the configuration file specifies real-time, or near real-time processing; and
at a visualization circuitry stage of the data stream processing pipeline circuitry, selecting among different visualization processing options by selecting a specific one of multiple different visualization processors respectively providing the different visualization processing options.

10. The method of claim 9, where the defined input group of input endpoints include, a database storage endpoint, a personal computer endpoint, a mobile device endpoint, a server endpoint, or any combination thereof.

11. The method of claim 9, where the defined output group of output endpoints include, a database storage endpoint, a personal computer endpoint, a mobile device endpoint, a server endpoint, or any combination thereof.

12. The method of claim 9, where:
the selected input endpoint includes a mobile device endpoint;
the selected output endpoint includes a database storage endpoint; and
the specific option combination includes publish-subscribe protocol reception, raw storage, batch processing, and a visualization processor selected for a database.

13. The method of claim 9, where the configuration file specifies the specific option combination for the endpoint selection by referencing configuration settings specified in other files external to the configuration file.

14. The method of claim 9, further including establishing subscription relationships, to setup a reactive messaging system, among the ingestion circuitry stage, the storage circuitry stage, the processing circuitry stage, or any combination thereof.

15. The method of claim 14, further including causing the setup of the reactive messaging system responsive to an asynchronous input data flow to the data stream processing pipeline circuitry.

16. The method of claim 9, further including setting up a dashboard visualization configured to provide monitoring of progress of data streams through the data stream processing pipeline circuitry.

17. A product comprising:
machine-readable media other than a transitory signal; and
instructions stored on the machine-readable media, the instructions configured to, when executed, cause a machine to:
in a data stream processing pipeline circuitry dynamically implement a pipeline flow configured with configuration settings specified in a configuration file, the pipeline flow defined by an endpoint selection, the endpoint selection including:
a selected input endpoint of a defined input group of input endpoints; and
a selected output endpoint of a defined output group of output endpoints;
select, responsive to the configuration settings included in the configuration file, between multiple different processing modes at multiple different execution speeds a specific option combination of pipeline stages based on the endpoint selection by:
at an ingestion circuitry stage of the data stream processing pipeline circuitry, select an ingestion option from among ingestion options, the ingestion option specified by the configuration settings, the ingestion options including:
stream processor reception configured to ingest a stream of data; and
publish-subscribe protocol reception configured to ingest a message; and
configure a writer circuitry option to output ingested data according to a storage option specified in the configuration settings;
at a storage circuitry stage of the data stream processing pipeline circuitry, select among storage options in a defined memory hierarchy and create, for a selected storage option, specific data models comprising specific table structures specified in the configuration file;

at a processing circuitry stage of the data stream processing pipeline circuitry, select among processing options including:
  batch processing selected when the configuration file specifies other than real-time, or near real-time processing; and
  in-memory processing at a speed faster than that of batch processing selected when the configuration file specifies real-time, or near real-time processing; and
at a visualization circuitry stage of the data stream processing pipeline circuitry, select among a plurality of different visualization options by selecting a specific one of multiple visualization processors; and
control and configure at least some of the specific option combination of pipeline stages according to configuration settings specified in the configuration file.

18. The product of claim 17, where:
  the selected input endpoint includes a mobile device endpoint;
  the selected output endpoint includes a database storage endpoint; and
  the specific option combination includes publish-subscribe protocol reception, raw storage, batch processing, and a visualization processor selected for a database.

19. The product of claim 17, where the configuration file specifies the specific option combination for the endpoint selection.

20. The product of claim 17, where the instructions are further configured to cause the machine to setup a dashboard visualization configured to provide monitoring of progress of data streams through the data stream processing pipeline circuitry.

* * * * *